Oct. 18, 1932.  H. V. REED  1,882,898
FRICTION CLUTCH
Filed May 22, 1929
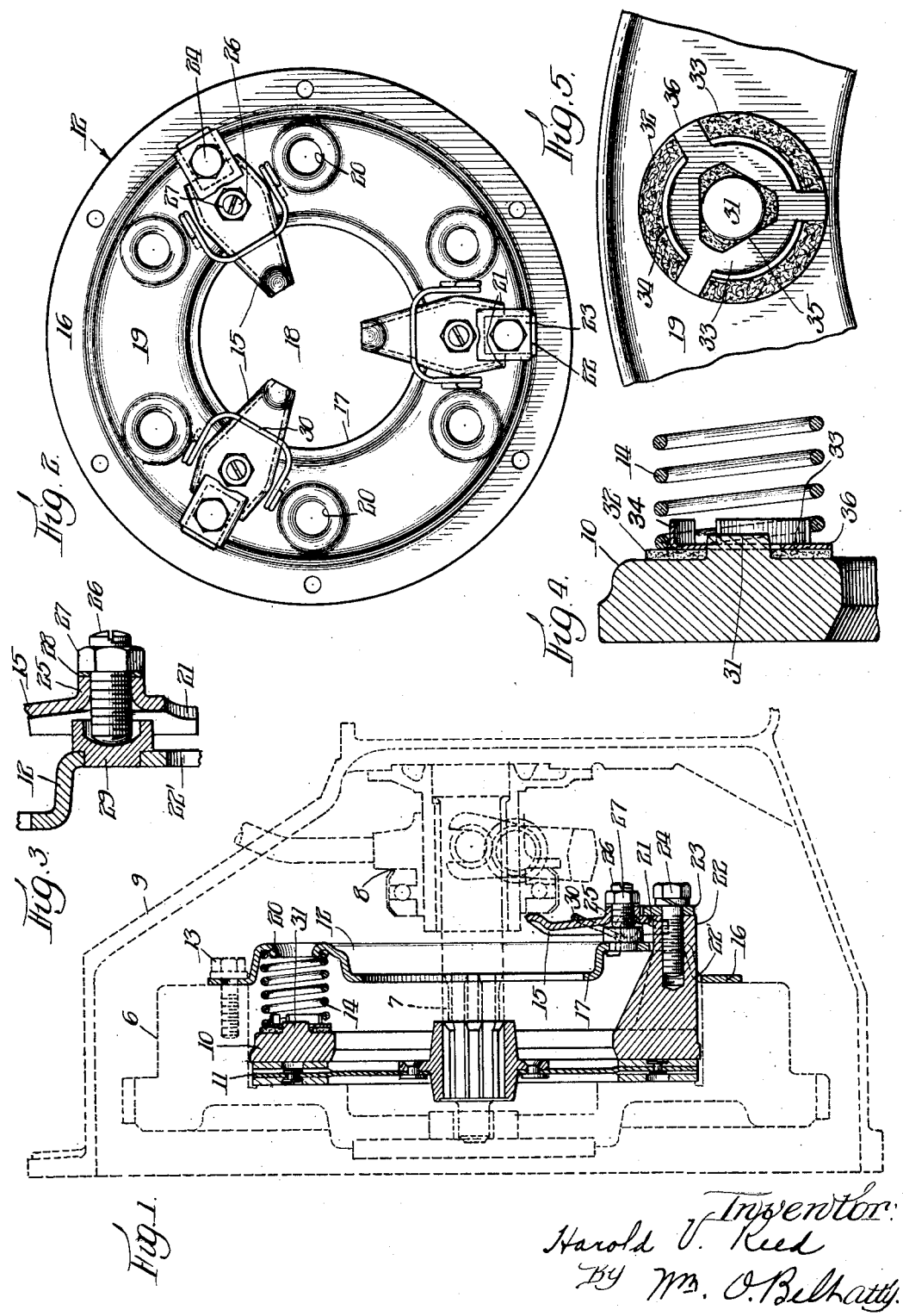

Patented Oct. 18, 1932

1,882,898

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

FRICTION CLUTCH

Application filed May 22, 1929. Serial No. 365,030.

This invention relates to friction clutches of the type which are adapted primarily but not exclusively for use in automotive vehicles.

One of the objects of the invention is to provide a light weight clutch of strong and substantial construction adapted for efficient operation in automotive vehicles and other installations.

Another object is to provide a clutch of novel construction and having a number of its parts made of stamped sheet metal to simplify and reduce the weight of the clutch without sacrificing strength or impairing the operation of the clutch.

A further object of the invention is to support the clutch levers in a novel manner to operate freely but under restraint sufficient to prevent chatter.

And a further object is to protect the pressure springs against heat from the pressure plate by providing novel heat insulating devices between the springs and the plate.

In the accompanying drawing illustrating a selected embodiment of the invention

Fig. 1 is a sectional elevation showing my improved clutch in full lines and associated parts in broken lines.

Fig. 2 is a plan elevation of the clutch looking at the outside of the cover.

Fig. 3 is a detail sectional view of the clutch lever pivot devices.

Fig. 4 is a sectional view and

Fig. 5 is a plan view showing the insulated spring seat.

Referring to the drawing the clutch illustrated is shown as including a flywheel 6 rigidly mounted on the usual driving shaft (not shown), a driven shaft 7, a clutch release device 8 operating on the driven shaft, and a housing 9 enclosing the clutch and its associated parts. A pressure plate 10 is arranged for bodily movement to clamp a clutch plate 11 between itself and the flywheel to impart motion from the driving shaft and flywheel through the clutch plate to the driven shaft on which the clutch plate is mounted. It will not be necessary to describe a clutch plate of particular construction because my invention may be used with clutch plates of many different kinds. A cover 12 is fastened to the flywheel by bolts 13. Pressure springs 14 are interposed between the pressure plate and the cover for normally clamping the clutch plate in operative engagement with the flywheel, and clutch levers 15 are arranged to be operated by the clutch release device to retract the pressure plate against the tension of springs 14 and release the clutch. The cover is a sheet metal stamping having a peripheral flange 16 to lie flat against the flywheel, an inner annular flange 17 about a central opening 18, and an intermediate annular raised channel portion 19 between the flanges 16 and 17. An opening is provided in the channel portion 19 of the cover for each spring and the edge of the opening is bent inward to provide a seat 20 on the inside of the cover for the spring. The construction of the cover with the outer and inner flanges, the intermediate channel portion and the spring seats provides a rigid and substantial construction which will resist the pressures and strains to which the cover is subjected in service. The clutch levers are sheet metal stampings and they are pivotally mounted on the front side of the cover with their inner ends arranged to be operated by the clutch release device and their outer ends bifurcated at 21 to embrace bosses 22 on the pressure plate to maintain the levers in proper position and to make them revolve with the pressure plate, the cover and the flywheel. The bosses project through the openings 22' in the channel portion of the cover and plates 23 are fastened by bolts 24 on the outer ends of the bosses against which the outer end portions of the levers bear to retract the pressure plate. The projection of the bosses through the cover insures rotation of the pressure plate with the cover and flywheel. The clutch lever has a collar 25 struck up therefrom to receive the pivot bolt 26 which is provided with an adjusting nut 27. A washer 28 is interposed between the nut and the outer end of the collar 25. A socket bearing 29 is secured in the channel portion 19 of the cover to receive the inner end of the pivot bolt 26, Fig. 3. The inner end of the pivot bolt is rounded and the bearing face of the socket bearing is also rounded to accommodate the bolt so that the bolt can pivot freely in the socket bearing as required for the operation of the clutch lever. A tension spring 30 is engaged with the cover and overlies the inner end portion of the clutch lever to hold the outer end portion of the clutch lever constantly in operative contact with the bearing plate 23. A circular stud 31 is provided on the pressure plate for each spring and an insulating washer 32 is arranged on the stud against the face of the plate. A cup 33 is also arranged on the circular stud 31 and against the washer 32 and this cup has an annular flange 34 to enter the inner end of the spring, Figs. 4, 5. The opening 35 in the cup which receives the stud is preferably triangular in shape, its side edges contacting with the stud to center the cup thereon and its angles forming open spaces so that the flow of heat from the stud of the pressure plate to the cup and spring is materially reduced. The flange 34 is cut at spaced intervals and bent outward to provide lips 36 to receive the springs 14.

My invention provides a clutch of novel and simple construction having a strong and rigid cover plate stamping carrying clutch levers on the front side thereof arranged to be operated by the clutch release device for releasing the pressure plate in the usual manner of automotive clutch operation. The parts are few in number, simple in construction, easily assembled, and positive in operation. The novel mounting of the clutch lever provides for efficient operation without binding or chattering and the novel insulated spring seat holds the spring in proper position and reduces to a minimum the flow of heat from the pressure plate thereto.

Changes may be made in the form, construction, and arrangement of parts of my invention as may be found to be necessary or desirable to adapt it for different clutches for other purposes and I reserve the right to make all such changes within the scope of the following claims:

I claim:

1. A friction clutch comprising a cover adapted to be secured to a flywheel and having openings therein, a pressure plate having bosses projecting through said openings, wear plates secured on the outer ends of the bosses, levers pivotally mounted on the outer side of the cover and engaging said wear plates, and springs engaged with the cover and overlying the levers.

2. A friction clutch comprising a cover adapted to be secured to a flywheel and having openings therein, a pressure plate having bosses projecting through said openings, pivot bolts bearing on the outer side of the cover, and sheet metal levers having collars struck up to receive said bolts and engaging said bosses.

3. A friction clutch comprising a cover adapted to be secured to a flywheel and having openings therein, a pressure plate having bosses projecting through said openings, pivot bolts bearing on the outer side of the cover, and sheet metal levers mounted on said bolts and having collars struck up to receive said bolts and engaging said bosses, the outer ends of said levers being bifurcated to receive said bosses.

4. A friction clutch comprising a pressure plate having a circular stud thereon, and a spring seat on the stud comprising an insulating washer against the plate, and a cup on the washer and having a triangular opening to receive the stud, the straight edges of said opening engaging the stud to center the cup on the stud.

5. A friction clutch comprising a pressure plate having a circular stud thereon, and a spring seat on the stud comprising an insulating washer against the plate, and a cup on the washer, and having an opening to receive the stud and an upstanding flange to enter and retain the spring on the cup, and lips cut from the flange and bent outwardly to receive the end of the spring.

6. A friction clutch comprising a pressure plate having a stud thereon, a spring seat on said stud comprising an insulating washer bearing against the plate, and a cup on the washer and having a polygonal opening to receive the stud, the straight edges of said opening engaging the stud at spaced intervals to center the cup on the stud with a minimum contact between the cup and the stud to reduce the heat transferring contact therebetween.

HAROLD V. REED.